US009733713B2

(12) United States Patent
Zhou et al.

(10) Patent No.: US 9,733,713 B2
(45) Date of Patent: Aug. 15, 2017

(54) LASER BEAM BASED GESTURE CONTROL INTERFACE FOR MOBILE DEVICES

(71) Applicant: Futurewei Technologies, Inc., Plano, TX (US)

(72) Inventors: Liang Zhou, Chengdu (CN); Pengwei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 404 days.

(21) Appl. No.: 13/726,909

(22) Filed: Dec. 26, 2012

(65) Prior Publication Data

US 2014/0176420 A1 Jun. 26, 2014

(51) Int. Cl.
G06F 3/01 (2006.01)
G06F 3/00 (2006.01)
G06T 7/246 (2017.01)

(52) U.S. Cl.
CPC .............. *G06F 3/017* (2013.01); *G06F 3/005* (2013.01); *G06F 3/011* (2013.01); *G06T 7/246* (2017.01); *G06T 2207/10016* (2013.01)

(58) Field of Classification Search
CPC .......... G06F 3/005; G06F 3/011; G06F 3/017
See application file for complete search history.

(56) References Cited

U.S. PATENT DOCUMENTS 6,346,933 B1* 2/2002 Lin ..................... G06K 9/00335
345/157
2001/0044858 A1* 11/2001 Rekimoto ............... G06F 3/011
710/1
2009/0198354 A1 8/2009 Wilson
2010/0199230 A1* 8/2010 Latta ....................... G06F 3/017
715/863
2010/0309123 A1* 12/2010 Sawai ................... G06F 3/0346
345/157

(Continued)

FOREIGN PATENT DOCUMENTS

EP 1087327 A2 3/2001
EP 2428870 A1 3/2012

OTHER PUBLICATIONS

Davis, R., et al., "IAP Virtual Meeting Series," CSAIL-IAP, Computer Science and Artificial Intelligence Laboratory, Massachusetts Institute of Technology, Cambridge, MA, 48 pages.

(Continued)

*Primary Examiner* — Lisa Landis
(74) *Attorney, Agent, or Firm* — Conley Rose, P.C.

(57) ABSTRACT

A method of receiving control instructions for a device, comprising receiving two or more video frames, analyzing the video frames for at least one foreground image and at least one background image, evaluating each video frame for a two dimensional aspect comprising a first area having a relatively higher channel intensity value in one or more channels than the channel intensity values of a second area, recording coordinates associated with the aspect in each of the video frames, evaluating the coordinates to determine a motion trajectory, and matching the motion trajectory to a prerecorded motion trajectory in a matching table, wherein the matching table contains associations of motion trajectories and control instructions, and obtaining the control instruction associated with the prerecorded motion trajectory.

15 Claims, 8 Drawing Sheets

(56) References Cited

U.S. PATENT DOCUMENTS

| | | | | |
|---|---|---|---|---|
| 2011/0025818 A1* | 2/2011 | Gallmeier | ............... | G06F 3/017 348/14.07 |
| 2012/0194429 A1* | 8/2012 | Kwon | ..................... | G06F 3/038 345/157 |
| 2015/0009149 A1* | 1/2015 | Gharib | .................... | G06F 3/005 345/168 |

OTHER PUBLICATIONS

Lockton, R., 4th Year Project Report, "Hand Gesture Recognition Using Computer Vision," Balliol College, Oxford University, 69 pages.

Ju, S., et al., "Analysis of Gesture and Action in Technical Talks for Video Indexing," IEEE, 1997, pp. 595-601.

Mittal, A., et al., "Hand Detection Using Multiple Proposals," 2011, pp. 1-11.

Kirstein, C., et al., "Interaction with a Projection Screen Using a Camera-Tracked Laser Pointer," Informatik VII (Computer Graphics), University of Dortmund, D-44221, Dortmund, Germany, 2 pages.

Cavens, D., et al., "Interacting with the Big Screen: Pointers to Ponder," Companion Proceedings, ACM SIGCHI '02 Conference on Human Factors in Computing System, 2002, 2 pages.

Yin, Y., et al., "Toward Natural Interaction in the Real World: Real-time Gesture Recognition," ICMI-MLMI, International Conference on Multimodal Interfaces and the Workshop on Machine Learning for Multimodal Interaction, Article No. 15, 2010, 9 pages.

Zhang, Z., et al., "A Flexible New Technique for Camera Calibration," Technical Report, MSR-TR-98-71, 22 (11): 1330-1334, Dec. 5, 2009, 22 pages.

Foreign Communication From a Counterpart Application, PCT Application No. PCT/CN2013/090490, International Search Report dated Apr. 3, 2014, 6 pages.

Foreign Communication From a Counterpart Application, PCT Application No. PCT/CN2013/090490, Written Opinion dated Apr. 3, 2014, 7 pages.

* cited by examiner

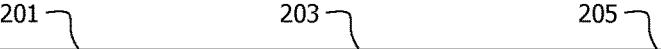

| Operations | Relationship among FG, BG and Laser Point | Motion Trajectory |
|---|---|---|
| Open | BG->FG | DC |
| Close | BG->FG | DC |
| Zoom In | BG->FG | CC |
| Zoom Out | BG->FG | AC |
| Drag | BG->FG | SC |
| Rotation Clockwise | BG->FG->BG | UMBT |
| Rotation Counter clockwise | BG->FG->BG | UMTB |
| Play | BG->FG | DC |
| Next Slide | - | HMLR |
| Previous Slide | - | HMRL |

CC: clockwise circle movement;
AC: Counter clockwise circle movement;
SC: single click;
DC: double click;
UMBT: vertical movement from bottom to top;
UMTB: vertical movement from top to bottom;
HMLR: horizontal movement from left to right;
HMRL: horizontal movement from right to left;
BG: laser point in background region;
FG: laser point in foreground image;

*FIG. 2*

LASER BEAM BASED GESTURE CONTROL INTERFACE FOR MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Humans communicate mainly by vision and sound. Consequently, greater use of vision and audio recognition can increase the intuitiveness of man-machine interfaces. Hand gesture recognition devices are well known. Some hand gesture recognition devices use motion sensor based user interfaces which require the purchase of additional hardware, including extra sensors, e.g., depth sensors. Other hand gesture recognition devices have a susceptibility to lighting conditions and require sufficient illumination control to obtain reliable indicia.

Visual presentation systems are well known and generally involve projection devices. Some presentation systems use a computer, keyboard, and mouse to interface with the presentation system and/or projection device. Since these are not properly classified as visual or audio controlled systems, these mechanisms of interfacing with visual presentation systems can be distracting, cumbersome, unnatural and inefficient.

SUMMARY

In one aspect, the disclosure includes a method of receiving control instructions for a device, comprising receiving two or more video frames, analyzing the video frames for at least one foreground image and at least one background image, evaluating each video frame for a two dimensional aspect comprising a first area having a relatively higher channel intensity value in one or more channels than the channel intensity values of a second area, recording coordinates associated with the aspect in each of the video frames, evaluating the coordinates to determine a motion trajectory, and matching the motion trajectory to a prerecorded motion trajectory in a matching table, wherein the matching table contains associations of motion trajectories and control instructions, and obtaining the control instruction associated with the prerecorded motion trajectory.

In another aspect, the disclosure includes a mobile device comprising a camera, a memory element storing a gesture matching table, wherein gestures comprise user body movements, and wherein the matching table contains associations of gestures and computer operations, and a processor configured to identify a two dimensional laser beam aspect in two or more images captured by the camera, observe a motion trajectory for the two dimensional aspect between the two or more images, correlate the motion trajectory with a gesture, identify the computer operation associated with the gesture in the matching table, and send a signal to execute the computer operation associated with the gesture.

In yet another aspect, the disclosure includes a system for interfacing with a monitoring device, comprising a projection surface, a projector configured to project an image on the projection surface, a handheld laser beam source configured to project a two dimensional aspect of a laser beam on the projection surface, and a monitoring device comprising a sensing device configured to detect the aspect on a projection surface, a camera configured to capture a first and second video frame, wherein each video frame comprises at least one foreground image and an aspect, a memory, and a processor configured to determine a motion trajectory for the aspect, wherein the motion trajectory corresponds to a gesture comprising an operator body movement, and wherein the motion trajectory is determined by comparing the position of the aspect at a first point in the first video frame to the position of the aspect at a second point in the second video frame, match the motion trajectory to a computer operation, and execute the computer operation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a sample gesture-operation matching table.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed are methods and systems that allow a smartphone using a single integral camera to recognize a visual gesture as translated to two dimensions by a laser pointer on a projection screen without adding additional interfacing hardware, sensors or components. Using the recognized gesture, the disclosed methods and systems may further enable the smartphone to communicate with a computer controlling a projector to perform some digital manipulation of electronic documents, slide shows, presentations, spreadsheets, etc.

Disclosed methods and systems include capturing Video Frames with a mobile device, segmenting the captured Video Frames into foreground images and background regions, identifying a laser pointer, then manipulating foreground images by moving the laser pointer according to predefined gesture movement routines as stored in a gesture matching table. By utilizing a two-dimensional (2D) approach to gesture-driven interaction rather than a three-dimensional (3D) approach, the disclosed methods and systems further avoid the complicated conventional hand detection and tracking approaches, which may necessitate computational and power demands in excess of those needed by the presently disclosed methods and systems.

Figure 1:
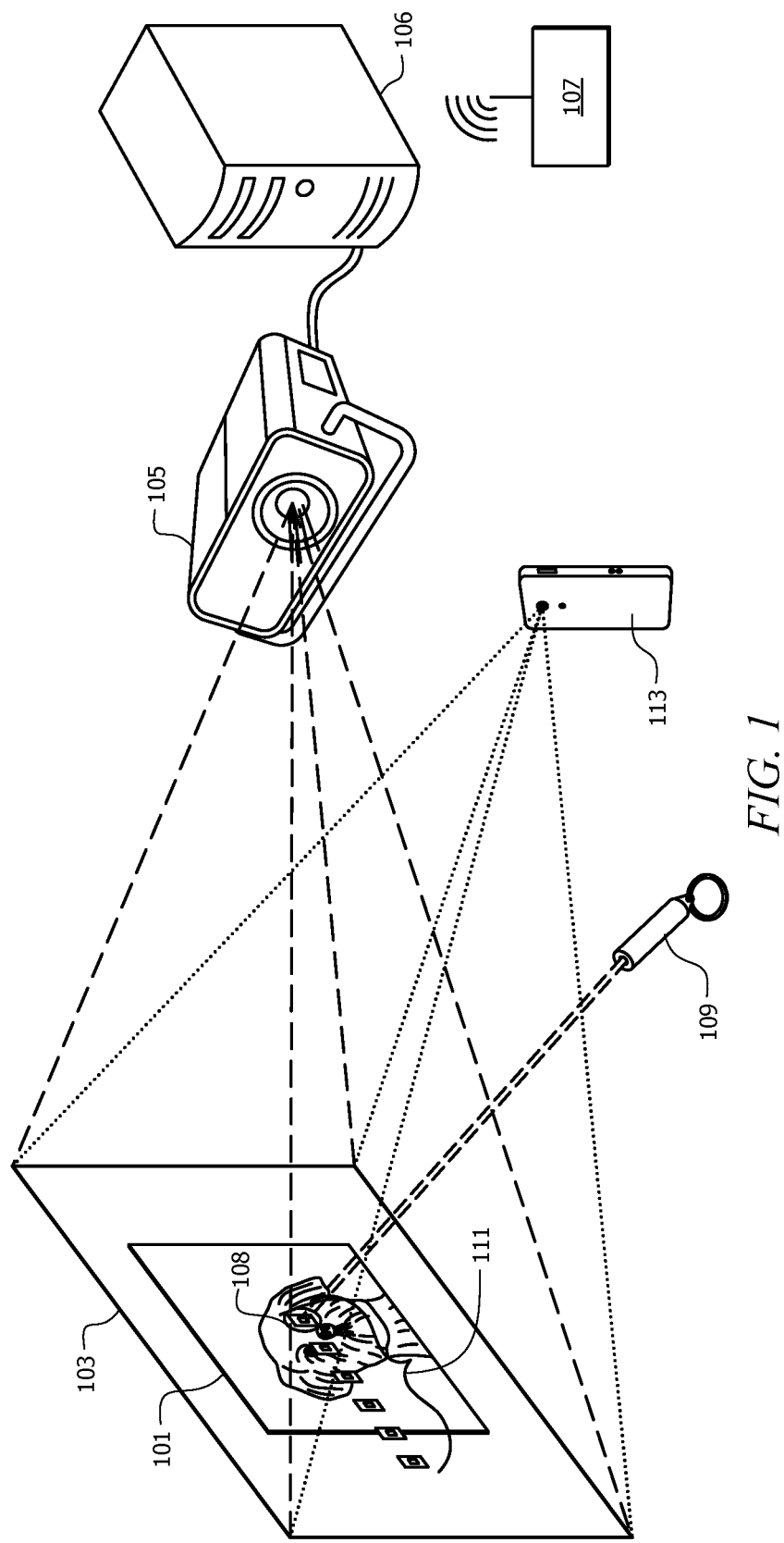
FIG. 1 is an embodiment of a gesture control interface (GCI) implementation.

FIG. 1 is an embodiment of a GCI implementation. FIG. 1 shows a foreground image 101, e.g., a PowerPoint projection, a picture slideshow, a motion video, a visual representation of a data file, and/or one or more other 2D displays, on a background region 103, also referred to herein as a background region, e.g., a projection screen or projection surface. The distinctions between foreground images and background regions are discussed further herein with respect to screen content understanding. Foreground image 101 may be displayed on background region 103 by a device 105, e.g., a light emitting diode (LED) projector. Device 105 may be connected to a computer 106 configured to control device 105, e.g., by controlling which foreground image 101 the device 105 will display. The computer 106 may also be configured to perform various operations on the foreground image 101 (or its underlying data object), e.g., zooming in/out, rotating clockwise/counter-clockwise, opening/closing, playing, copying, moving, deleting, etc., either directly at the computer 106 or by instructing the device 105 to perform such operations. The computer 106 may further be configured to communicate with a network access point 107, e.g., through a wireless local area network (WLAN). An aspect 108, e.g., a laser point, may be displayed on the region 103 by controller 109, e.g., a handheld laser beam source, e.g., a laser pen, a laser pointer, or other mobile light source. Path 111 may show a path or motion trajectory taken by the aspect 108 upon a user's 3D gesture body movement, which in turn moves controller 109. FIG. 1 also shows a mobile device 113, e.g., a mobile device and/or smartphone. Mobile device 113 may be in communication, e.g., using a WLAN, with the network access point 107 or, in other embodiments, in communication with computer 106 and/or device 105. Mobile device 113 may be suitably configured to receive and process foreground images and background regions as still images and/or video frames, which may be collectively or separately referred to herein following capture, recordation and/or processing integral to the mobile device 113 as "Video Frames." Mobile device 113 may comprise a camera, a central processing unit (CPU), and memory containing a database configured to store gesture-operation matching tables. In some embodiments, mobile device 113 carries the device 105 integrally or as a peripheral device, e.g., as a handheld or pico projector. In other embodiments, mobile device 113 is not mobile but rather is fixed in position, e.g., mounted to the device 105.

FIG. 2 is a sample gesture-operation matching table as may be stored in a database of a mobile device, e.g., mobile device 113 of FIG. 1. The gesture-operation matching table may be pre-configured with user-generic gestures, may be configured to input and record user-defined gestures, e.g., as input through a Gesture Enrollment program of FIG. 3A, or may be configured to accommodate a mixture of user-generic and user-specific gestures. Column 201 contains sample program operations and/or foreground image manipulations which a computer, e.g., the computer of FIG. 1, may perform on a data object, e.g., a foreground image 101 of FIG. 1. Column 203 contains sample relationships, e.g., motion trajectory, between (a) a detected 2D aspect trajectory, and (b) the captured foreground and background regions, e.g., between (a) path 111, and (b) captured foreground image 101 and background region 103 of FIG. 1, respectively. For example, a 2D aspect trajectory may begin at a background region, traverse a portion thereof, and traverse a portion of the foreground image, while another 2D aspect trajectory may be confined solely to the foreground image. Thus, column 203 relationships may assist in distinguishing between operations sharing similar 3D gestures. For example, BG→FG may indicate that the laser point trajectory began on the background region and proceeded into the foreground image. Column 205 contains sample motion trajectories which may be combined with the relationships indicated in column 203 to specify which program operation and/or foreground image manipulation from column 201 should be executed. For example, if a mobile device captured Video Frames showing a clockwise circle movement of a laser pointer originating on a background region and passing through a foreground image, the mobile device may process the Video Frames, refer to the gesture-operation matching table, and communicate with and cause a computer controlling the display of the foreground image to execute a 'zoom in' operation on the foreground image.

Figure 3A:
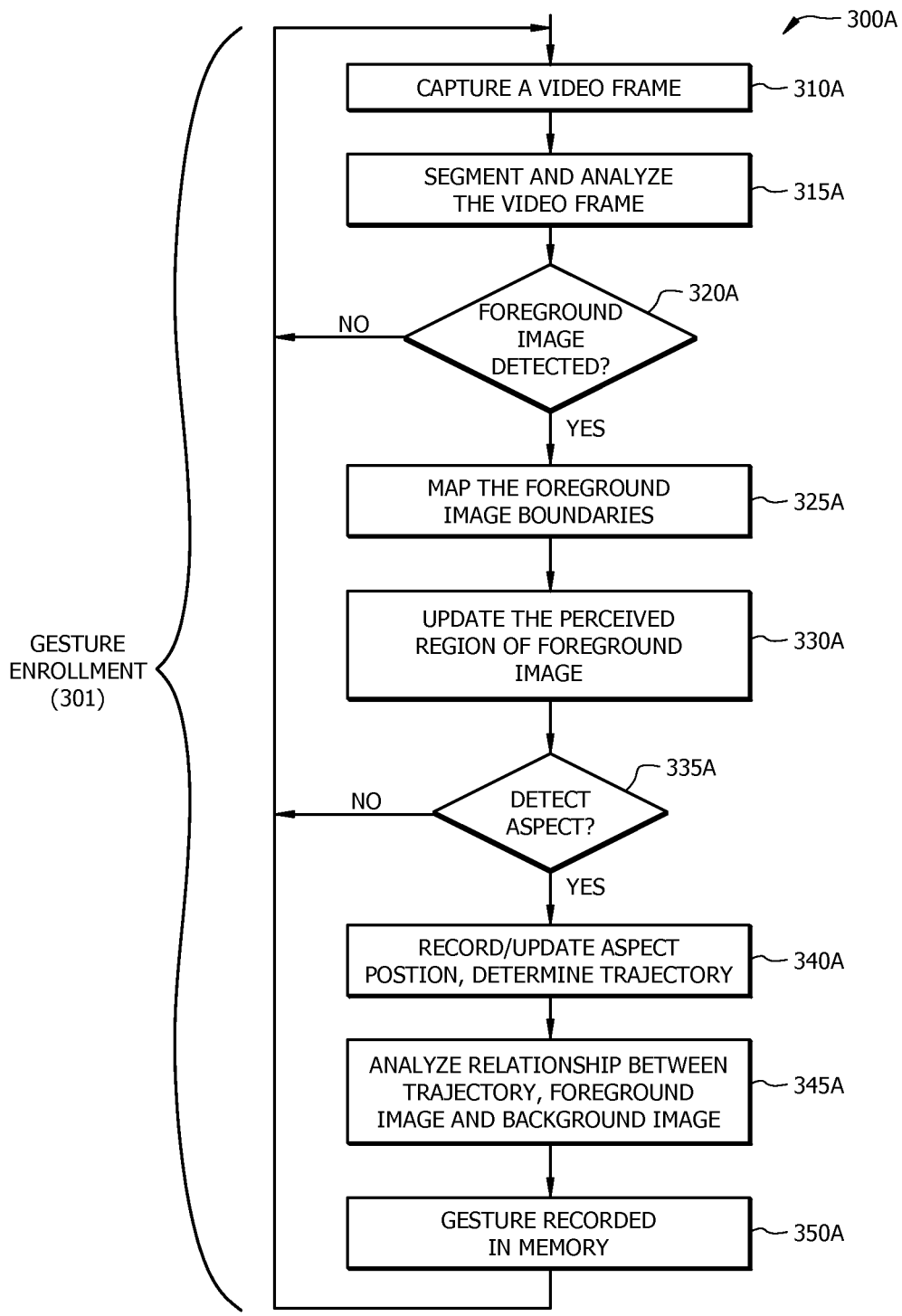
FIG. 3A shows a Gesture Enrollment for an embodiment of a GCI implementation method.
Figure 3B:
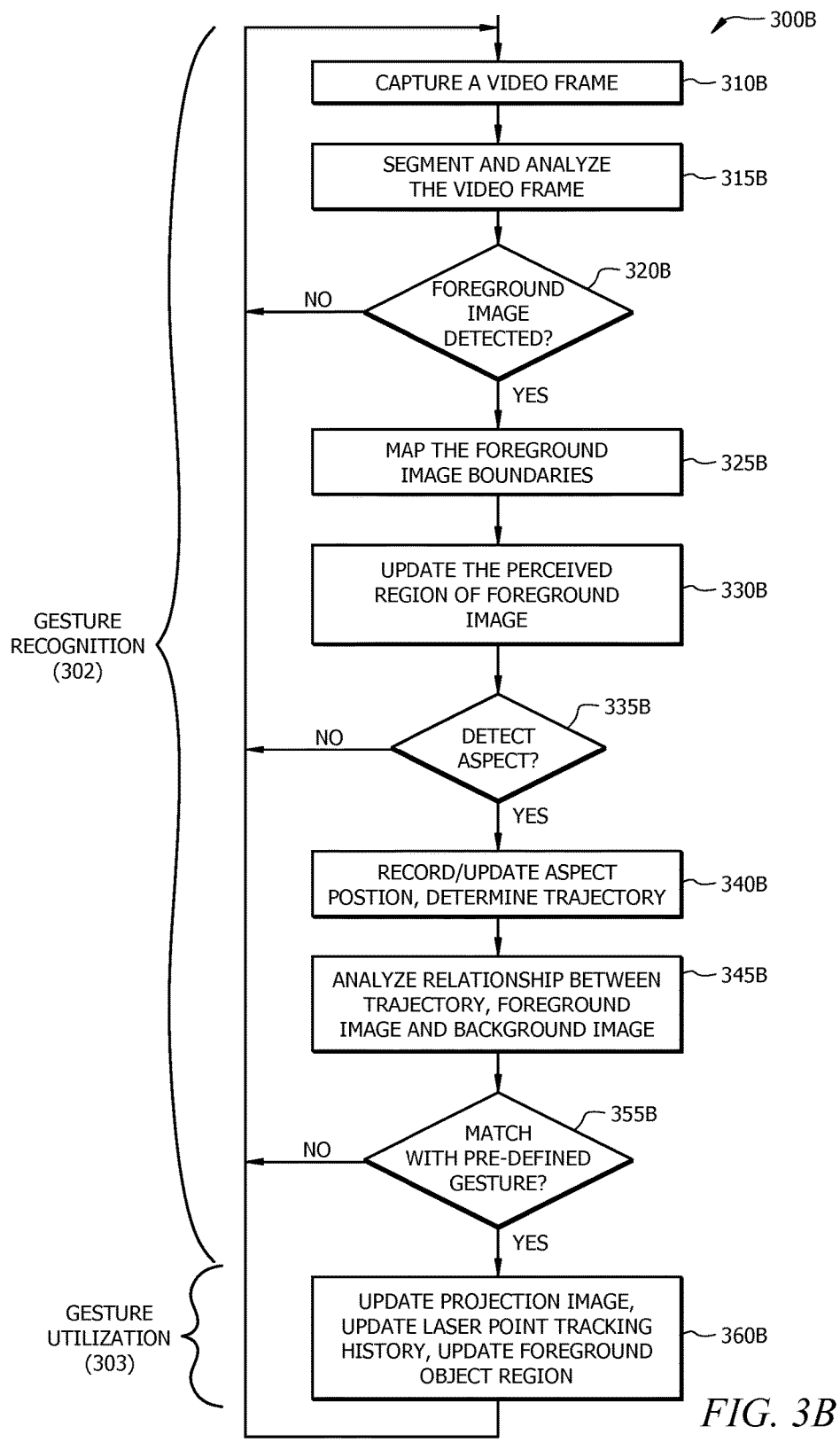
FIG. 3B shows a Gesture Recognition and Gesture Utilization for an embodiment of a GCI.

FIGS. 3A and 3B are flowcharts showing an embodiment of a GCI implementation method 300. Method 300A may be performed on any suitable computing platform, e.g., a mobile device 113 of FIG. 1, a server, a computer controlling a display, or jointly among any combination or permutation of such devices. Generally, use of the GCI may be divided into three phases: Gesture Enrollment 301 (shown in FIG. 3A), Gesture Recognition 302, and Gesture Utilization 303 (shown in FIG. 3B). Gesture Enrollment 301 may be characterized as a learning and/or recording phase, wherein users may populate a gesture-operation matching table with user-specified operations. Gesture Recognition 302 may be characterized as a phase wherein a gesture is identified (e.g., by the mobile device 113), and Gesture Utilization 303 may be characterized as an implementation phase where the identified gesture is used (e.g., by the computer 106 and/or the device 105) to control a digital object, e.g., a document or visual presentation.

Figure 4:
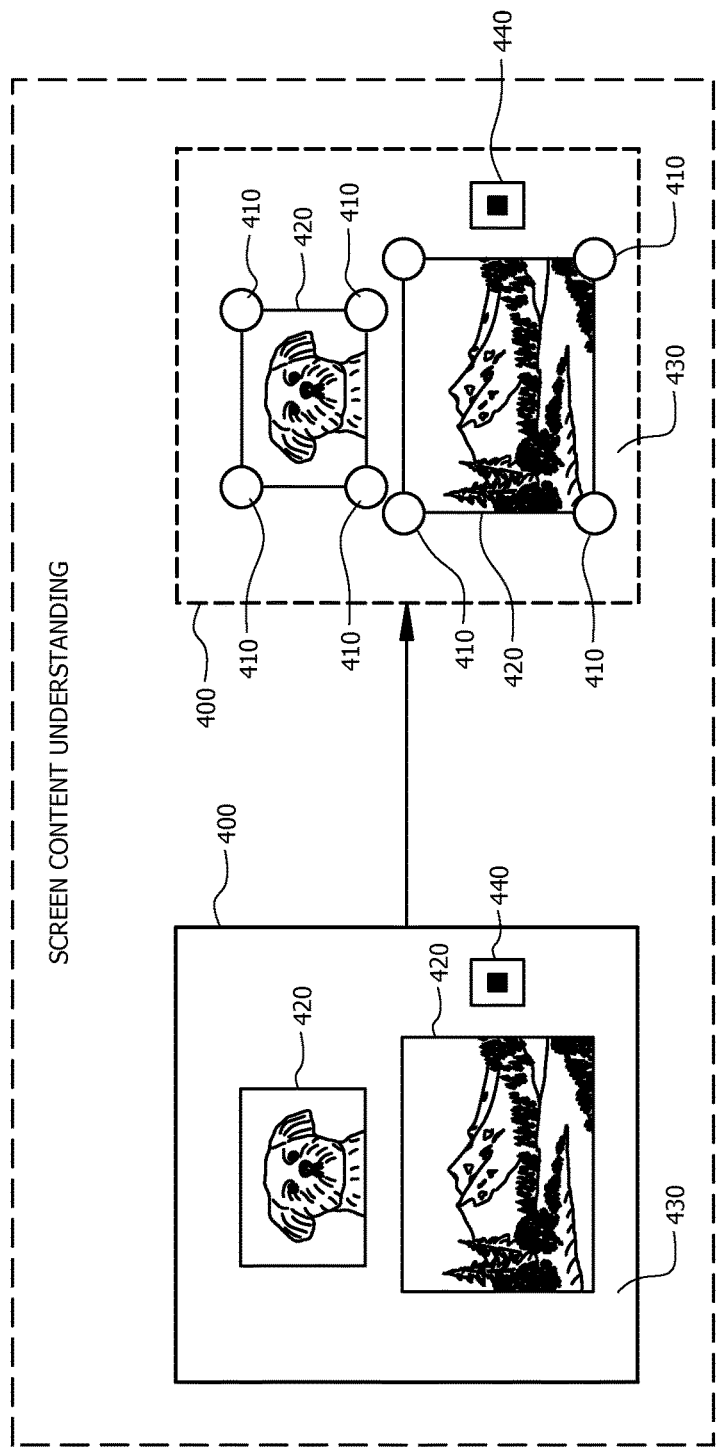
FIG. 4 is an embodiment of a screen content understanding process.

FIG. 3A shows a Gesture Enrollment 301 for an embodiment of a GCI implementation method 300A. During Gesture Enrollment 301, a user inputs and records a gesture into the memory of a device, e.g., into the gesture-operation matching table of FIG. 2, for later recognition during a future gesture matching process, e.g., during the Gesture Matching 302 of FIG. 3B. At block 310A the method 300A may capture at least one Video Frame, e.g., using mobile device 113 of FIG. 1. Method 300A may then enter a screen content understanding process, e.g., as illustrated in FIG. 4. Method 300A may segment and analyze the Video Frame(s) at block 315A. Image segmentation may determine the existence of a foreground image, e.g., foreground image 101 of FIG. 1, displayed on a background region, background region 103 of FIG. 1. If no foreground image is detected, at block 320A the method 300A may loop to block 310A and repeat the analysis on a new Video Frame until method 300A detects a foreground image. Once method 300A detects a foreground image, the method 300A may proceed to block 325A and map the foreground image boundaries with respect to a background region. At block 330A, the method 300A may update the perceived region of the foreground image stored in memory.

Figure 5:
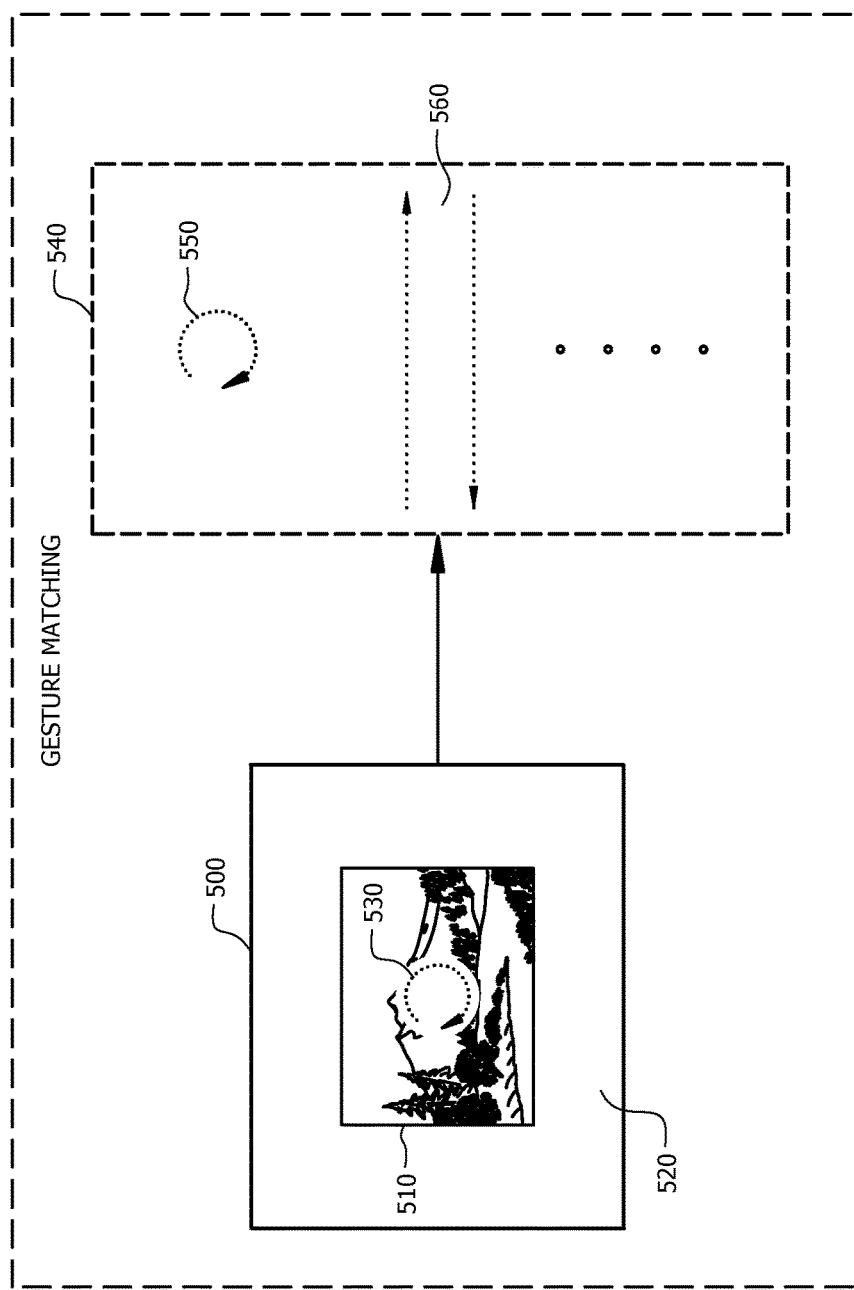
FIG. 5 is an embodiment of a gesture matching process.

Method 300A may analyze the Video Frame to determine the existence of a 2D aspect, e.g., aspect 108 of FIG. 1. For example, if a directional high intensity red laser source, e.g., a laser pointer, generated the 2D aspect, method 300 may recognize in a captured projected red green blue (RGB) color model image, e.g., a Video Frame, a small group of pixels having a much higher red channel intensity value than the group's surrounding pixels, even when overlaying a red portion of an underlying image. This analyzing process may be assisted by using a conventional tracking algorithm to predict where the 2D aspect would most likely appear, e.g., by leveraging temporal information about the trajectory of the 2D aspect gathered from previous frames. The predicted aspect location may be used in the determination as known by one of ordinary skill in the relevant art, e.g., as a substitute value, as an initial search location, etc. If no 2D aspect is detected at 335A, the method 300A may loop to block 310A and repeat until an aspect is detected. In another embodiment, multiple Video Frames are processed together and the method 300A may loop to another block in method 300A for a new Video Frame, e.g., block 330A. If a 2D aspect is detected at 335A, the method 300A may proceed to block 340A where the method 300A may record and/or update the 2D aspect position within the Video Frame. The method 300A may optionally loop as described above to accumulate additional 2D aspect positions to obtain sufficient data to observe a user gesture or aspect motion trajectory, e.g., a definite path between a 2D aspect in a first Video Frame and a 2D aspect in a second Video Frame. In some embodiments, this recordation/update may end the screen content understanding process, e.g., as depicted in FIG. 4. In some embodiments, the method 300A may then begin a gesture matching process, e.g., as depicted in FIG. 5. The method 300A may determine a trajectory of the 2D aspect, e.g., path 111 of FIG. 1, and may characterize the trajectory, e.g., as a characterized motion trajectory listed in column 205 of FIG. 2. At block 345A, the method 300A may analyze the relationship between the determined trajectory, the foreground image and the background region to determine a characterized relationship, e.g., a relationship listed in column 203 of FIG. 2. The method 300A may proceed to block 350A upon receipt of a gesture completion signal. The gesture completion signal may be the absence of the aspect or may be another predefined input limiting criteria, e.g., a separate completion gesture, a time delay elapses, a button on a device is depressed, etc. At block 350A, the user-defined gesture may be recorded. In some embodiments, Gesture Enrollment 301 further records the user's identity, permitting multiple specific users to be associated with particularized, user-specific gestures for the same actions without unintentional overlap.

FIG. 3B shows a Gesture Recognition 302 and Gesture Utilization 303 for an embodiment of a GCI method 300B. The steps of method 300B may be substantially the same as the steps of method 300A of FIG. 3A, with blocks 310B-345B correlating to blocks 310A-345A of FIG. 3A. Rather than proceeding to a block 350A, however, at block 355B the method 300B may evaluate the trajectory from 340B to determine whether it matches a pre-defined gesture, e.g., through a gesture matching process illustrated in FIG. 5. The identity of the gesture stored in memory, e.g., in the gesture-operation matching table of FIG. 2, which most closely approximates the trajectory identified at block 340B will be returned if the matching confidence is high. In some embodiments, standardized, user-generic gestures are preloaded in memory for use with block 350B matching. Methods of determining matching confidence are very well known in the art. If the matching confidence is not high, the method 300B determines that no match exists. If the relationship does not match a pre-defined gesture, the method 300B may loop to block 310B and repeat until a relationship is identified which matches a predefined gesture. In another embodiment, multiple Video Frames are processed together and the method 300 may loop to another block in method 300B for a new Video Frame, e.g., block 335B. The method 300B may then exit the gesture matching process.

Once a pre-defined gesture has been matched, the method 300B may proceed to Gesture Utilization 303. At block 360B, the method 300B may utilize the gesture identified and returned during Gesture Recognition 302 in a context appropriate manner, e.g., as an operation for a computer, e.g., computer 106 of FIG. 1. Once received by the computer, the computer may execute the operation, e.g., an instruction to manipulate electronic objects on a display, open a program or file, close a program or file, switch between programs or files, and/or transfer data from one device to a separate device, e.g., as illustrated in FIGS. 6A-6D, causing a change in the foreground image, e.g., foreground image 101 of FIG. 1.

FIG. 4 is an embodiment of a screen content understanding process. Once an analyzing device, e.g., mobile device 113 of FIG. 1, captures a Video Frame 400, e.g., the Video Frame of FIG. 1, the Video Frame may be further processed to detect and/or specify foreground images 420, a background region 430 and an aspect 440, e.g., foreground image 101, background region 103 and aspect 108 of FIG. 1, respectively. Distinctive features of the Video Frame may be analyzed for boundary points 410 of foreground images 420. If an aspect 440 is detected, the coordinates of aspect 440 may be mapped and recorded and/or updated. Properly mapping the boundaries of the foreground images 420 and background region 430 may aid in identifying the trajectory, e.g., path 111 of FIG. 1, taken by the aspect 440 upon a 3D gesture movement.

FIG. 5 is an embodiment of a gesture matching process. A plurality of Video Frames 500, e.g., a plurality of Video Frames 400 of FIG. 4, may be captured and analyzed by an analyzing device, e.g., mobile device 113 of FIG. 1. The plurality of Video Frames 500 may be processed to map the foreground image 510, background region 520, and aspect, e.g., foreground image 420, background region 430, and aspect 440 of FIG. 4. By comparing the plurality of Video Frames 500, the analyzing device may identify a circular path motion trajectory 530, e.g., path 111 of FIG. 1, traveled by a 2D aspect, e.g., aspect 440 of FIG. 4. The circular path motion trajectory 530 may be compared against a pre-recorded path entry, e.g., a gesture recorded during Gesture Enrollment 301 of FIG. 3B, in database 540 storing gestures on the analyzing device, e.g., in a gesture-operation matching table of FIG. 2. To match a gesture, the analyzing device may compare the circular path motion trajectory 530 against one or more database 540 entries, e.g., circular path motion trajectory 550 and/or linear path motion trajectory 560, to determine a gesture match. If the matching confidence is not high, the analyzing device may determine that no match exists. If the analyzing device determines with high confidence that circular path motion trajectory 530 approximates a specific entry in database 540, the gesture may be considered 'matched' and the gesture matching process may generate appropriate outputs, e.g., according to a gesture-operation matching table of FIG. 2.

Figure 6A:
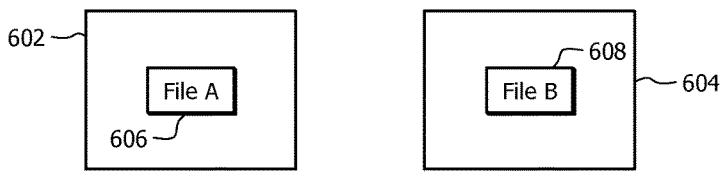
FIG. 6A shows two side by side projection areas.

FIGS. 6A-6D shows two projection areas, 602 and 604, which may each separately be the same as background region 103 of FIG. 1. Projection areas 602 and 604 may be projected using two separate devices, e.g., two devices 105 of FIG. 1, and may be jointly or independently controlled by one or more computers, e.g., the computer of FIG. 1. Projection area 602 has a foreground image 606 and projection area 604 has a foreground image 608. The foreground images 606 and 608 may correlate to foreground images 510 of FIG. 5 and may be data files or other data objects residing on one or more computers controlling the display of projection areas 602 and 604. In FIG. 6A, the two projection areas 602 and 604 are depicted side-by-side, with no overlapping space but instead with empty space therebetween.

Figure 6B:
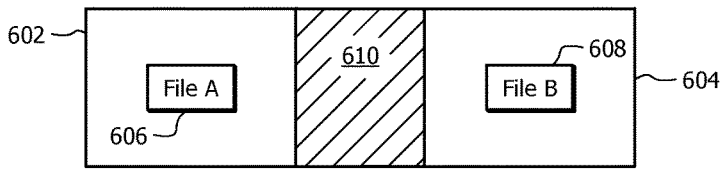
FIG. 6B shows two projection areas having a shared space.

FIG. 6B shows projection areas 602 and 604 displayed such that there is an overlapping shared space 610. The projection areas 602 and 604 may be overlapped, e.g., by moving projectors, by mechanically adjusting the projection areas, or by digitally overlapping the projection areas 602 and 604. Other methods of overlapping the projection areas 602 and 604 will be apparent to those of skill in the art. The overlapping shared space 610 may comprise a horizontal, vertical or other overlapping region of projection areas 602 and 604. The shared space 610 may be recognized as overlapping shared space by a device performing a gesture recognition process, e.g., Gesture Recognition 301 of FIG. 3.

Figure 6C:
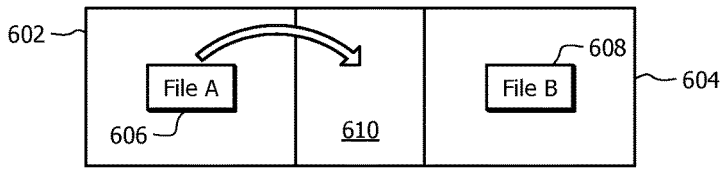
FIG. 6C shows a sample data manipulation using the shared space and an embodiment of GCI processing.

FIG. 6C shows foreground image 606 being visually placed inside of shared space 610, e.g., by dragging the file with a laser pointer using an embodiment of the GCI. When foreground image 606 is moved to shared space 610, data associated with foreground image 606 may be transferred and/or copied from a first storage device associated with projection area 602 to a separate storage device associated with projection area 604. For example, a user may use a GCI to click-and-drag a file using a laser pointer aspect from the hard drive of a first computer coupled to a projector displaying the first projection area 602, e.g., a first computer 106 of FIG. 1, to the hard drive of a second computer coupled to a projector displaying the second projection area 604, e.g., a second computer 106 of FIG. 1, using the shared space 610.

Figure 6D:
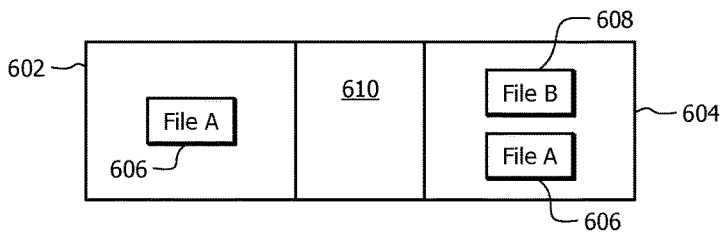
FIG. 6D shows a possible final state following manipulation using the shared space and an embodiment of GCI processing.

FIG. 6D shows a possible final state following movement of foreground image 606 to shared space 610. In FIG. 6D, a foreground image 606 exists on both projection areas 602 and 604 and, consequently, exists on the separate storage devices associated with projection areas 602 and 604.

Figure 7:
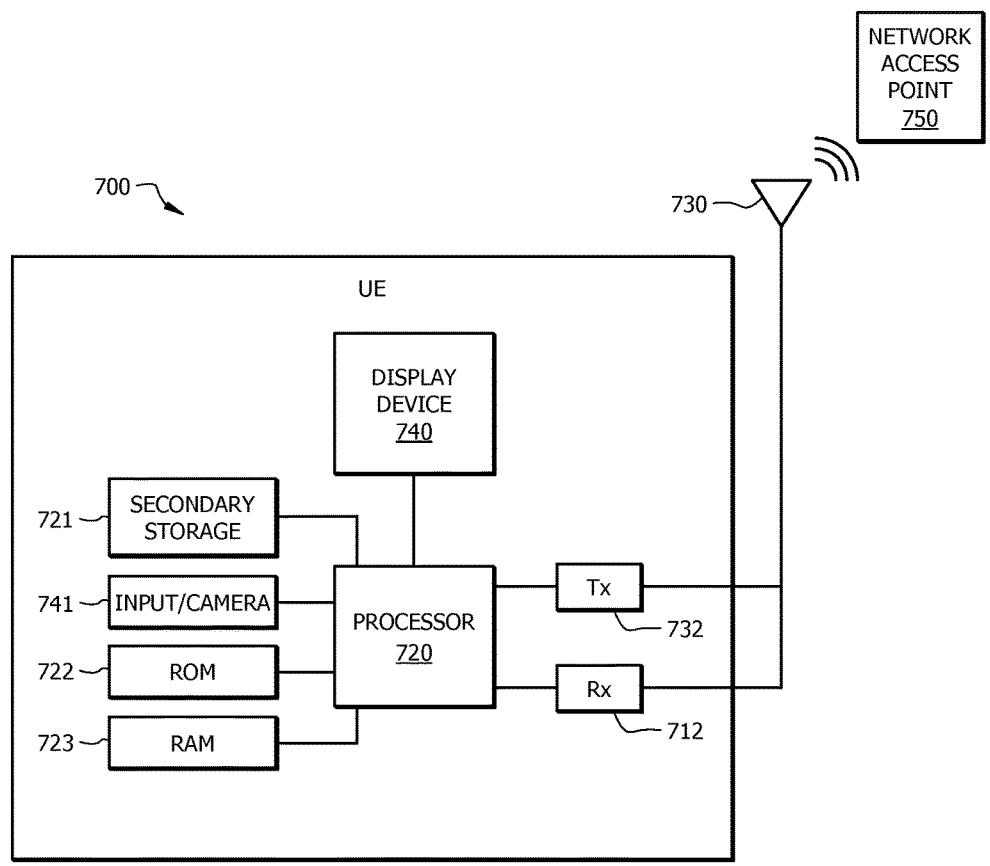
FIG. 7 is a schematic diagram of an embodiment of a mobile device.

Mobile devices, such as those discussed herein, operating in a telecommunications system may be required to wirelessly transmit and receive multiple types of data substantially simultaneously. Mobile devices may be equipped with a plurality of antennas that may operate as transmitters and/or receivers (or transceivers) to transmit and receive data. The mobile devices' antennas may wirelessly communicate with a network by transmitting and/or receiving data over specified frequencies. FIG. 7 is a schematic diagram of an embodiment of a mobile device 700, e.g., mobile device 113 of FIG. 1. Mobile device 700 may comprise a two-way wireless communication device having voice and data communication capabilities. In some aspects, voice communication capabilities are optional. The mobile device 700 generally has the capability to communicate with other computer systems on the Internet. Depending on the exact functionality provided, the mobile device 700 may be referred to as a data messaging device, a two-way pager, a wireless e-mail device, a cellular telephone with data messaging capabilities, a wireless Internet appliance, a wireless device, a smart phone, a mobile device, and/or a data communication device, as example.

Mobile device 700 may comprise a processor 720 (which may be referred to as a central processor unit or CPU) that is in communication with memory devices including secondary storage 721, read only memory (ROM) 722, and random access memory (RAM) 723. The processor 720 may be implemented as one or more CPU chips, one or more cores (e.g., a multi-core processor), or may be part of one or more application specific integrated circuits (ASICs) and/or digital signal processors (DSPs). The processor 720 may be configured to implement any of the schemes described herein, and may be implemented using hardware, software, firmware, or combinations thereof.

The secondary storage 721 may be comprised of one or more solid state drives, disk drives, and/or other memory types and is used for non-volatile storage of data and as an over-flow data storage device if RAM 723 is not large enough to hold all working data. Secondary storage 721 may be used to store programs that are loaded into RAM 723 when such programs are selected for execution. The ROM 722 may be used to store instructions and perhaps data that are read during program execution. ROM 722 may be a non-volatile memory device may have a small memory capacity relative to the larger memory capacity of secondary storage 721. The RAM 723 may be used to store volatile data and perhaps to store instructions. Access to both ROM 722 and RAM 723 may be faster than to secondary storage 721.

The mobile device 700 may communicate data (e.g., packets) wirelessly with a network via a network access point 750. As such, the mobile device 700 may comprise a receiver (Rx) 712, which may be configured for receiving data (e.g. wireless packets or frames) from other components. The receiver 712 may be coupled to the processor 720, which may be configured to process the data and determine to which components the data is to be sent. The mobile device 700 may also comprise a transmitter (Tx) 732 coupled to the processor 720 and configured for transmitting data to other components, for example by using protocols such as Institute of Electrical and Electronics Engineers (IEEE) 802.11, IEEE 802.16, 3rd Generation Partnership Project (3GPP), Global System for Mobile Communications (GSM), or similar wireless protocols. The receiver 712 and transmitter 732 may be coupled to a plurality of antennas 730, which may be configured to receive and transmit wireless radio frequency (RF) signals. In some embodiments, Tx 732 and Rx 712 may be replaced by a transceiver comprising the functionality of both Tx 732 and Rx 712.

The mobile device 700 may also comprise a device display 740 coupled to the processor 720, that displays output thereof to a user. The mobile device 700 and the device display 740 may configured to display representations of data to a user. The device display 720 may comprise a Color Super Twisted Nematic (CSTN) display, a thin film transistor (TFT) display, a thin film diode (TFD) display, an organic light-emitting diode (OLED) display, an active-matrix OLED display, or any other display screen. The device display 740 may display in color or monochrome and may be equipped with a touch sensor based on resistive and/or capacitive technologies. In some embodiments, the device display The mobile device 700 may further comprise an input device 741 coupled to the processor 720, which may allow the user to input commands to the mobile device 700. In the case that the display device 740 comprises a touch sensor, the display device 740 may also be considered the input device 741. In addition to and/or in the alternative, an input device 741 may comprise a mouse, trackball, built-in keyboard, external keyboard, and/or any other device that a user may employ to interact with the mobile device 700. In the context of GCI implementation, input device 741 may be a camera.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of controlling a visual display, comprising:
    receiving, by a device having an image capturing device, a plurality of video frames each comprising at least one foreground image and at least a portion of a background region, wherein the background region is visible;
    analyzing, by executing instructions using a processor of the device, a first video frame of the plurality of video frames to detect foreground images that are displayed on the background region in the first video frame;
    determining a boundary for each of the foreground images in the first video frame;
    mapping the boundaries for each of the foreground images to the background region in the first video frame;
    determining a position of a two dimensional aspect in the first video frame relative to the boundaries of the foreground images in the first video frame;
    recording coordinates associated with the two dimensional aspect in each of the video frames;
    evaluating the coordinates to determine a motion trajectory of the two dimensional aspect;
    determining a path traversed by the two dimensional aspect relative to the boundaries of the foreground images and the background region based on the recorded coordinates; and
    matching the determined path and the motion trajectory to a predetermined path and a prerecorded motion trajectory in a matching table to obtain associated control instructions for a device controlling the visual display.

2. The method of claim 1 further comprising storing the plurality of video frames in a memory of the device.

3. The method of claim 1, wherein the background region comprises two background areas, and wherein a first background area is associated with a first display control device and a second background area is associated with a second display control device.

4. The method of claim 3, wherein the two background areas share an overlapping region, wherein a first foreground image of the foreground images is associated with a data object, and wherein the control instructions comprise transferring the data object associated with the first foreground image from the first display control device to the second display control device in response to the first foreground image being placed in the overlapping region.

5. The method of claim 1, wherein the device is a mobile device comprising a camera, wherein receiving the plurality of video frames comprises capturing the video frames with the camera, and wherein the method further comprises sending the control instructions to a separate device for execution.

6. The method of claim 5, wherein three or more video frames are received, and wherein the method further comprises:
   employing a tracking algorithm on the first video frame and a second video frame of the three or more video frames to develop a predicted aspect location; and
   utilizing the predicted aspect location when analyzing a third video frame for the two dimensional aspect.

7. The method of claim 1, wherein the motion trajectory is associated with a gesture, wherein the gesture is associated with a body movement of a user, and wherein matching comprises storing an association of the motion trajectory with a first of the control instructions.

8. A mobile device comprising:
   a camera configured to capture a plurality of video frames;
   a memory element storing a gesture matching table, wherein gestures comprise user body movements, and wherein the gesture matching table contains associations of gestures and computer operations; and
   a processor configured to:
      detect foreground images in a first video frame of the plurality of video frames;
      determine a boundary for each of the foreground images in the first video frame;
      map the boundaries for each of the foreground images to a background region in the first video frame;
      determine a position of a two dimensional laser beam aspect in the first video frame relative to the boundaries of the foreground images in the first video frame;
      record coordinates associated with the two dimensional laser beam aspect in each of the plurality of video frames;
      determine a path traversed by the two dimensional laser beam aspect relative to the boundaries of the foreground images and the background region;
      observe a motion trajectory for the two dimensional laser beam aspect between the foreground images and the background region;
      correlate the motion trajectory and the determined path with a gesture;
      identify a computer operation associated with the gesture in the gesture matching table; and
      send a signal to execute the computer operation associated with the gesture.

9. The mobile device of claim 8, wherein the gesture matching table comprises at least one user-defined gesture.

10. The mobile device of claim 8, wherein the two dimensional laser beam aspect is identified based on a strength of an intensity value of at least one color channel.

11. The mobile device of claim 8, wherein the computer operation is selected from a group consisting of: manipulating electronic objects on a display, opening a program or file, closing a program or file, switching between programs or files, and transferring data from one device to a separate device.

12. The mobile device of claim 8, wherein the processor is further configured to enroll the gesture in the memory.

13. The mobile device of claim 12, wherein the gesture is associated with a specified user.

14. The mobile device of claim 8, wherein the mobile device is a smartphone.

15. The mobile device of claim 14, further comprising identifying the two dimensional laser beam aspect by monitoring the plurality of video frames for an area in the plurality of video frames having a relatively higher channel intensity value in one or more channels than channel intensity values of an area surrounding the area.

* * * * *